(12) United States Patent
Asano

(10) Patent No.: US 9,611,906 B2
(45) Date of Patent: Apr. 4, 2017

(54) HYDRAULIC VEHICLE CLUTCH SYSTEM AND METHOD

(75) Inventor: Tetsushi Asano, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 1877 days.

(21) Appl. No.: 11/832,849

(22) Filed: Aug. 2, 2007

(65) Prior Publication Data

US 2009/0032359 A1  Feb. 5, 2009

(51) Int. Cl.
| F16D 48/00 | (2006.01) |
| F16D 48/02 | (2006.01) |
| F16D 25/12 | (2006.01) |
| F16D 48/06 | (2006.01) |

(52) U.S. Cl.
CPC ........ F16D 48/02 (2013.01); F16D 25/123 (2013.01); F16D 48/062 (2013.01); F16D 48/066 (2013.01); F16D 2048/0236 (2013.01); F16D 2500/1027 (2013.01); F16D 2500/10412 (2013.01); F16D 2500/3024 (2013.01); F16D 2500/7041 (2013.01); F16D 2500/70217 (2013.01); F16D 2500/70252 (2013.01); F16D 2500/70282 (2013.01); F16D 2500/70448 (2013.01)

(58) Field of Classification Search
USPC ..................................................... 192/85.63
See application file for complete search history.

(56) References Cited

U.S. PATENT DOCUMENTS

| 4,982,809 A | * | 1/1991 | Nakamura et al. ........... 180/248 |
| 5,135,071 A | | 8/1992 | Shibahata et al. |
| 5,630,316 A | * | 5/1997 | Itsuji et al. ..................... 60/418 |
| 6,681,912 B2 | | 1/2004 | Suzuki et al. |
| 6,807,472 B2 | * | 10/2004 | Ford et al. ...................... 701/58 |
| 6,848,555 B2 | | 2/2005 | Sakata et al. |
| 6,948,604 B2 | * | 9/2005 | Puiu ................................ 192/35 |
| 7,007,782 B2 | | 3/2006 | Anwar et al. |

(Continued)

FOREIGN PATENT DOCUMENTS

| DE | 102005014654 | 10/2006 |
| EP | 1236918 | 9/2002 |

(Continued)

OTHER PUBLICATIONS

Search Report from European Patent App. No. 08155967.6 (Jul. 29, 2008).
Japanese Office Action for related Japanese Patent Application No. 2008-190670 dated Jun. 6, 2012.
Japanese Office Action for related Japanese Patent Application No. 2008-190671 dated Jul. 4, 2012.

Primary Examiner — Robert A Siconolfi
Assistant Examiner — Ryan Dodd
(74) Attorney, Agent, or Firm — Kenealy Vaidya LLP

(57) ABSTRACT

A hydraulic system for a vehicle clutch assembly can include a pump and a purge valve for regulating hydraulic pressure supplied to the clutch. The hydraulic pressure at the pump can be set to a value higher than the operating pressure for the clutch. The purge valve can be configured to purge hydraulic pressure from the hydraulic system so that an optimum, controllable, and/or pre-determined operating pressure can be supplied to the clutch. The system can be configured to provide accurate control of the clutch(es), continuous cooling capacity to the hydraulic system components, lateral torque control when two separate hydraulic circuits are used, weight and cost reduction of the vehicle clutch, as well as other vehicle functions and characteristics.

14 Claims, 5 Drawing Sheets

(56) References Cited

U.S. PATENT DOCUMENTS

| | | | |
|---|---|---|---|
| 7,021,445 B2 | 4/2006 | Brissenden et al. | |
| 7,059,460 B2 * | 6/2006 | Duan et al. | 192/70.12 |
| 7,111,717 B2 | 9/2006 | Arai et al. | |
| 7,395,736 B2 * | 7/2008 | Davidsson et al. | 74/665 F |
| 7,946,402 B2 * | 5/2011 | Gassmann et al. | 192/85.61 |
| 2002/0036128 A1 | 3/2002 | Amanuma et al. | |
| 2004/0159520 A1 | 8/2004 | Anwar et al. | |
| 2004/0251070 A1 * | 12/2004 | Sakata et al. | 180/247 |
| 2005/0023102 A1 | 2/2005 | Brissenden et al. | |
| 2007/0215428 A1 * | 9/2007 | Capito | 192/35 |
| 2009/0038908 A1 * | 2/2009 | Quehenberger | F16D 25/0638 192/85.32 |

FOREIGN PATENT DOCUMENTS

| | | |
|---|---|---|
| EP | 1371868 | 12/2003 |
| JP | 59-219529 A | 12/1984 |
| JP | 4-353027 A | 12/1992 |
| JP | 9-310750 A | 12/1997 |
| JP | 10-306775 A | 11/1998 |
| JP | 11-247981 A | 9/1999 |
| JP | 2000-142163 A | 5/2000 |
| JP | 2001-113971 A | 4/2001 |
| JP | 2004-19769 A | 1/2004 |
| JP | 2006-214514 A | 8/2006 |
| WO | WO2005/064187 | 7/2005 |

* cited by examiner

HYDRAULIC VEHICLE CLUTCH SYSTEM AND METHOD

BACKGROUND

1. Field

The presently disclosed subject matter relates to a vehicle clutch actuator and in particular a hydraulically controlled clutch actuator for a wet-type multiple disc clutch and its associated method.

2. Description of the Related Art

Existing vehicle drive force transfer systems deliver a torque from the engine to the wheels of the vehicle through the vehicle drive train/transmission. In a torque transfer system for on-demand or user actuated four wheel drive modes for a vehicle, power from the engine transmission may be selectively split between the front and rear wheels by incorporating a clutch mechanism in a rear wheel differential.

One example of a user controlled power transmitting device is described in U.S. Pat. No. 5,135,071 to Shibahata et al. Torque from a propeller shaft is transferred to a pair of rear wheel axles through a speed control device and a pair of left and right variable torque transmitting clutches. Each variable torque transmitting clutch is enclosed in a clutch case and contains multiple pairs of inner and outer friction plates or discs which are pressed together by a clutch actuating mechanism. When these pairs of discs are brought together, torque supplied by a common shaft is transferred to the drive axle of a wheel. The clutch actuating mechanism for these plates have sometimes included an electromagnetic actuator that controls a piston with presser members which are used to press the clutch mechanism's inner and outer plate pairs together. However, typically, a hydraulically controlled piston type actuating mechanism has been utilized, such as that described in U.S. Pat. No. 6,848,555 to Takatoshi Sakata et al.

The concept of providing and managing an on-demand type of torque transfer mechanism in which variable torque is provided in a four wheel drive system has also recently been implemented. Such a mechanism is known to provide excellent vehicle stability and control in all types of weather and road conditions. In addition, variable torque four wheel drive systems often minimize the drawbacks of conventional four-wheel drive systems in terms of weight, noise, performance and design capacity limits. U.S. Pat. No. 7,021,445 to Brissenden discloses an on-demand type of variable torque transfer mechanism for incorporation into a vehicle drive train. Unlike conventional on-demand four-wheel drive systems, which often react only to wheel slippage, the conventional variable torque management systems do not wait for wheel slip before beginning activation of semi or total four wheel drive mode. Instead, torque is proactively delivered to the rear wheels whenever the vehicle is accelerating for improved traction and control in both dry and slippery road conditions. When wheel slippage is detected, a variable torque management system can be configured to apportion additional torque to the rear in proportion to the amount of wheel slip. The system can continuously monitor the vehicle's dynamic condition via sensors in the engine, brake and throttle systems, and can adjust front-to-rear torque split for maximum control.

A central, computer-controlled, Power Control Unit (PCU) has been used to determine the right level of torque split (using sophisticated algorithms) for any given moment to provide optimal traction and stability. Torque can be delivered to the rear wheels via an electronic rear differential mechanism that employs a set of electrically controlled wet clutch packs to take up torque from the propeller shaft as the system demands.

Electric clutch actuation for on-demand type clutch mechanisms is currently a very common mode of actuation for the on-demand clutch mechanism. Recently, hydraulic actuation of the clutch has also been attempted. However, there remains a need to advance hydraulic clutch actuation techniques, and to address recognized system limitations. For example, the size, weight, and electrical power consumption requirements along with cooling capacity of current hydraulic clutch mechanisms currently can result in bulky and expensive systems that are sometimes hampered by limited power characteristics, limited reaction time characteristics, limited cooling capacity, limited control, weight considerations, etc.

SUMMARY

According to one aspect of the disclosure, a hydraulic actuator for a clutch mechanism includes an electric pump and a purge valve controlled by an electronic control unit. The hydraulic pressure output from the pump is set to be higher than the operating pressure for the clutch and the purge valve is controlled to selectively purge hydraulic pressure from a supply line so that precise control over an operating pressure for the clutch is maintained. According to this disclosure, a minimum number of pressure adjusting hydraulic components are needed for clutch control. In one embodiment, a single pump and a single valve comprise the hydraulic circuit.

According to an aspect of the disclosed subject matter, an apparatus for transferring a torque from a vehicle transmission to a wheel of a vehicle can include a clutch having a driven part and a driving part, a hydraulic system configured to actuate the clutch by placing the driven part into engagement with the driving part, the hydraulic system including operating structures that are configured to either act upon or to be acted upon by a hydraulic fluid resulting in a change of pressure of the hydraulic fluid. The operating structures can consist essentially of a piston configured to move the driven part into engagement with the driving part when an operating hydraulic pressure is supplied to the piston, a pump configured to supply an output hydraulic pressure to the piston, and a purge valve located between the pump and the piston. The apparatus can also include a controller configured to control the pump and purge valve to provide a desired hydraulic pressure to the piston.

According to another aspect of the disclose subject matter, an apparatus for transferring a torque from a vehicle transmission to two wheels of a vehicle can include a first clutch having a first driven part and a first driving part, a second clutch having a second driven part and a second driving part, a hydraulic system configured to independently and selectively actuate the first clutch and the second clutch by placing the first driven part into engagement with the first driving part and by independently and selectively placing the second driven part into engagement with the second driving part. The hydraulic system can include a first piston configured to move the first driven part into engagement with the first driving part to actuate the first clutch when a first operating hydraulic pressure is supplied to the first piston, a second piston configured to move the second driven part into engagement with the second driving part to actuate the second clutch when a second operating hydraulic pressure is supplied to the second piston, a first pump configured to supply a first output hydraulic pressure, a second pump configured to supply a second output hydraulic pressure, a first purge valve located between the first pump and the first piston, a second purge valve located between the second pump and the second piston, a first pump hydraulic line connected between the first pump and the first purge valve, and a first piston hydraulic line connected between the first purge valve and the first piston. The hydraulic system can be configured such that a first pump pressure of hydraulic fluid is the same along the entire first pump hydraulic line from the first pump to the first purge valve, and the hydraulic system is also configured such that a first piston pressure of hydraulic fluid is the same along the entire first piston hydraulic line from the first purge valve to the first piston. The apparatus can also include a controller configured to separately and independently control the first pump and first purge valve and the second pump and second purge valve to provide a first desired hydraulic pressure to the first piston and a second desired hydraulic pressure to the second piston.

According to another aspect of the disclosed subject matter, a method for transmitting torque to a vehicle drive component can include providing a first vehicle clutch configured to transmit torque from a vehicle power unit to a first vehicle wheel when the first vehicle clutch is actuated, providing a first hydraulic circuit including hydraulic fluid and in which a first pump is connected by a first pump line to a first purge valve, and the first purge valve is connected to a first piston by a first purge valve line, the first piston being configured to actuate the vehicle clutch when a first operating pressure of the hydraulic fluid is applied to the first piston, and the first pump being configured to act on the hydraulic fluid to output a first pump hydraulic pressure. The method can also include increasing the first pump hydraulic pressure that is output by the first pump until the first pump hydraulic pressure is greater than the first operating pressure, and opening the first purge valve to cause hydraulic fluid pressure in the first purge valve line to be equal to the operating hydraulic pressure for the first piston.

BRIEF DESCRIPTION OF THE DRAWINGS

The disclosed subject matter of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
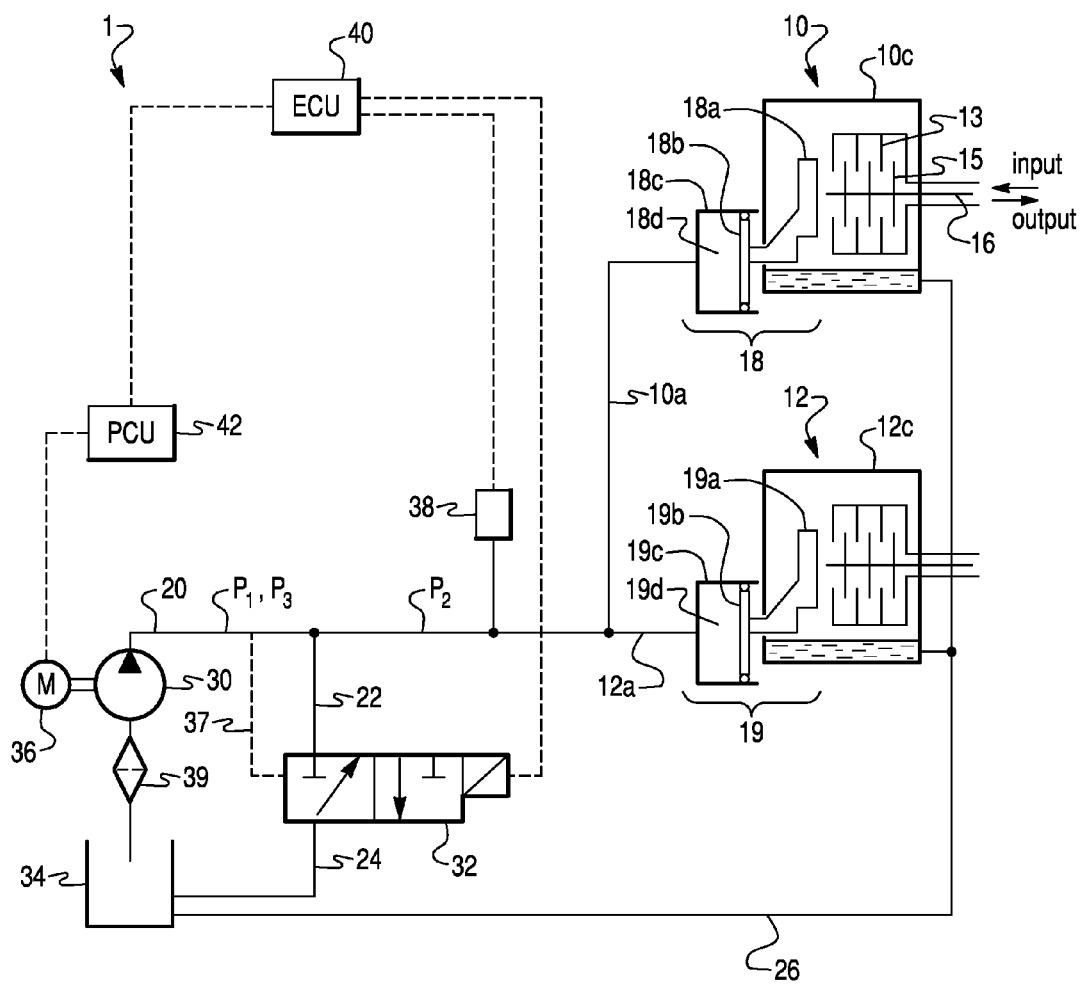
FIG. 1 is a schematic diagram of an embodiment of a hydraulic vehicle clutch system made in accordance with principles of the disclosed subject matter.

FIG. 1 depicts a schematic hydraulic circuit diagram for an embodiment of a hydraulic vehicle clutch system 1 made in accordance with principles of the disclosed subject matter. The system 1 can include a pump 30 that is connected to a pair of wet-type multi-disc friction clutches 10 and 12, respectively, via hydraulic fluid lines. A purge valve, such as solenoid valve 32, can be used to regulate the hydraulic pressure delivered to the clutches 10, 12. In one embodiment of the disclosure, the clutches 10, 12 may be a pair of variable torque transmitting clutches that are integrated into a vehicle's rear differential mechanism. When engaged, the clutches 10, 12 transfer torque from a propeller shaft to the rear wheels of the vehicle. The amount of torque transfer can be varied by varying the amount of fluid pressure that is delivered to each of the clutches 10, 12, as will be described in more detail below. Separate ones of the clutches 10, 12 can be located on opposite sides of the rear differential, such as between a left wheel and the rear differential and between the right wheel and the rear differential, respectively. In another embodiment, at least one clutch set can be located in the drive shaft between the engine/power plant and the rear differential to provide drive to the rear wheels.

For purposes of the description of this embodiment, the description for the clutch 10 applies equally to clutch 12. The clutch 10 may include a series of outer friction plates 13 (a driving part) and inner friction plates 15 (a driven part). A drive axle 16 for a vehicle wheel is connected to the inner plates 15. Friction plates 13, 15 can be immersed in a lubricating fluid (e.g., hydraulic oil, etc.) located in a clutch case 10c. Outer friction plates 13 may be connected to a common shaft which is coupled to, for example, a planetary gear system. In the alternative, the outer friction plates 13 can be configured to be driven by a propeller shaft and hypoid gear in combination. The hypoid gear being similar in construction to a spiral bevel gear, but designed to connect non-parallel shafts that do not intersect (e.g., connecting the propeller shaft with the shaft of the outer friction plates 13). Thus, the outer friction plates 13 can be driven from an input from a vehicle power unit (e.g., internal combustion engine, electric motor, etc.). For example, the vehicle power unit can supply power to the outer friction plates 13 via a vehicle drive train which can include a rear differential that is connected to a drive shaft and vehicle transmission. Of course, a front differential can also be provided in the vehicle drive train to provide power to the front wheels of the vehicle.

An actuation device 18 can be used to actuate the clutch 10. As shown in FIG. 1, the actuation device 18 includes a presser member 18a connected to a hydraulic piston 18b. When the hydraulic piston 18b is displaced by hydraulic fluid, presser member 18a presses the outer plates 13 into engagement with the inner plates 15, thereby coupling the plates 13, 15 in torsion. Torque may then be transferred from the power unit and drive train via the clutch 10 to the drive axle 16. The actuation device 18 includes a cylinder 18c forming a chamber 18d. The hydraulic piston 18b is displaced within the chamber 18d by hydraulic pressure introduced into the chamber 18d. Hydraulic pressure is supplied to piston chamber 18d through first piston line 10a.

Hydraulic pressure can be delivered to the clutches 10, 12 via a pump line 20 that is connected to first and second piston lines 10a and 12a which are respectively connected to the first and second pistons/chambers 18b&c, 19 b&c. A pump 30 and motor 36 can be configured to act in combination with valve 32 to produce a standby pump pressure P1 and an active pump pressure P3 in the pump line 20. However, the production of the standby pump pressure P1 is not necessary. For example, the pump and motor can simply circulate hydraulic fluid for cooling purposes, etc., when an active pump pressure P3 is not required by the system. In addition, the pump and motor can be powered off when not needed, and the system would not provide any pressurized fluid flow that would cool and/or lubricate the system. A purge valve, such as solenoid 32, can be configured to reduce the hydraulic pressure supplied to the first and second piston lines 10a, 12a by diverting a portion of the fluid delivered from the pump 30. For example, a valve input line 22 can connect the valve 32 to the supply line 20. A valve output line 24 then directs fluid to the reservoir 34 after passing through the valve 32. Thus, the valve 32 can be considered to be connected to the pump 30 "in parallel" with the actuation device(s). A pilot line 37 can be provided with the valve 32 to provide a feedback passage to the valve 32. Moreover, valve 32 can be configured to act as a balance valve which balances the solenoid thrust force, generated upon receipt of a signal from ECU 40, with pressure from the feedback line 37. The valve input line 22 and pilot line 37 can be considered passage lines that allow the valve 32 to be connected to the pump 30 in parallel with the actuation device(s) 18, 19. Thus, the pump 30 activates the actuation device(s) 18, 19 regardless of the position of the valve 32. The valve 32 can be used to control the pressure seen by the actuation device(s) 18, 19, but not to specifically turn on and off the actuation device(s) 18, 19.

A pressure sensor 38 can be used in the system to detect piston pressure P2, which is the pressure of the hydraulic fluid located downstream of the valve 32 and which is the pressure realized at the first and second pistons/chambers 18b&c, 19b&c. The pump 30 draws hydraulic fluid from a reservoir 34 which receives the hydraulic fluid removed from the supply line 20 by the valve 32 and the hydraulic fluid returned from the clutch cases 10c and 12c via return line 26. A filter 39 can be placed between the pump 30 intake and the reservoir 34 to clean the hydraulic fluid before it is re-routed through the hydraulic circuit(s). In addition, if desired, a separate cooling/lubrication pump can be provided that is configured to separately feed oil or other cooling fluid to the clutch 10 and/or clutch 12.

As noted above, the hydraulic components of the system 1 can be integrated into a rear casing of a vehicle that includes clutches 10, 12 and a rear differential. The relatively few component parts that may be used for the hydraulic actuator according to this disclosure can reduce the complexity, weight and packaging requirements of a clutch actuator, without losing an ability to retain precise, on-demand control over the clutches 10, 12 during a variety of driving conditions. Additionally, it has been found that the hydraulic actuator system can affect a transfer of high torque loads over a short duration through the clutches without the need for cams or additional friction plates in the clutch. In one embodiment, the hydraulic actuator system can be configured for producing a maximum operating pressure of 1 MPa for clutches 10 and 12 (and pistons 18 & 19). However, pump design can be reconfigured to easily permit an operating pressure of 3 MPa or more. It should be understood that a pressure force EM clutch operates at a force that is less than a force that a hydraulic clutch is able to produce, for example 300-350 kgf as compared to 1000 kgf or more.

The dashed lines in FIG. 1 indicate the control lines for the various hydraulic components. For example, the valve 32 can be controlled by an electronic control unit (ECU) 40, which signals when clutches 10, 12 should be actuated to provide additional or different drive force to the vehicle's wheel(s). A pump motor 36 can be controlled by a pump control unit (PCU) 42 which is controlled by commands sent from the ECU 40. It will be understood that although FIG. 1 illustrates ECU 40 and PCU 42 as separate from each other, these controllers may be integrated into a single ECU. Further, the PCU 42 may be located at the same or a different location from the hydraulic actuator. In one embodiment, the pump 30 can be a fixed displacement electric pump. The motor 36 can be a brushless DC motor, and the valve 32 can be a two position, two-way linear solenoid valve. The valve 32 may be operated in a fully open position, fully closed position, or at intermediate positions as directed by the ECU 40 to provide a great deal of control with regard to the amount of torque that is transmitted by the clutches 10, 12. Moreover, the valve position can depend on a combination of the hydraulic pressure and the command signal provided by the ECU 40.

It should be noted that the hydraulic system 1 of FIG. 1 is devoid of an accumulator, which is typically used for storing hydraulic pressure needed to activate clutches 10, 12. Instead, when the ECU 40 determines that the clutches need to be actuated, a control signal is sent to motor 36 to increase the output pump pressure P3 to a value that may be greater than the desired operating pressure for clutches 10, 12. The output pressure P3 may be further adjusted depending on the torque loading requirements while the clutches 10, 12 are actuated. It should also be mentioned that hydraulic system 1 may include only two hydraulic components that regulate hydraulic pressure that is seen at the piston: the pump 30 and the valve 32. Thus, a greatly simplified hydraulic actuator design, providing weight savings and reduced packaging size for the clutches is possible. The system can be configured to be primarily static in nature, such that P1=P2=P3 when balance is achieved.

Figure 2:
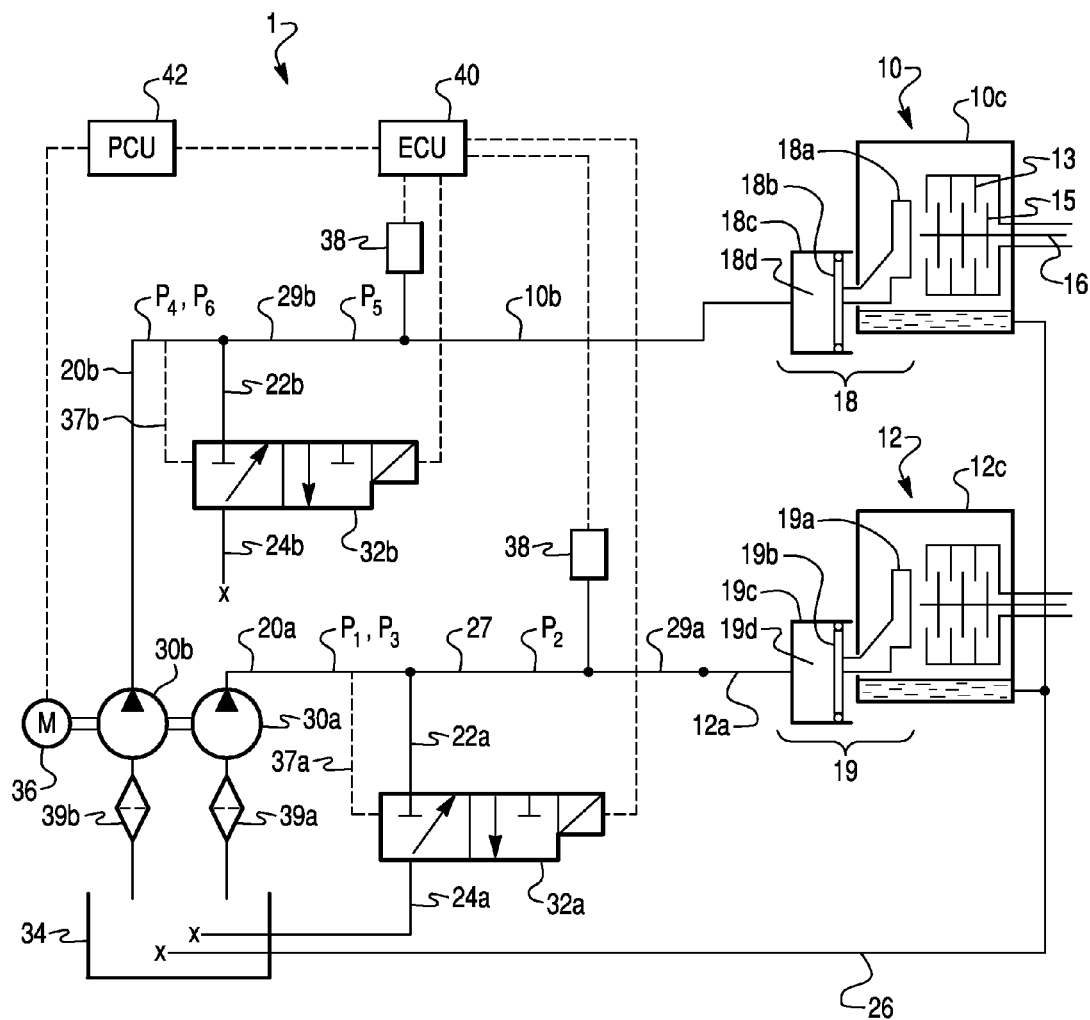
FIG. 2 is a schematic diagram of another embodiment of a hydraulic vehicle clutch system made in accordance with principles of the disclosed subject matter.

FIG. 2 is a schematic diagram of another embodiment of a hydraulic vehicle clutch system in which two pumps 30a and 30b are provided to circulate hydraulic fluid within two separately and independently controllable hydraulic circuits 29a and 29b. The separate circuits 29a and 29b allow independent and selective control of each of the clutches 10 and 12 such that two separate drive wheels of a vehicle can be independently and selectively driven. Thus, vehicle stability control and highly accurate drive slippage control can be accomplished using the system shown in FIG. 2. For example, if the system is installed in a rear differential for a vehicle and the vehicle is cornering, additional torque can be applied to an appropriately selected (typically outside) drive wheel to provide greater steerage. Determination of amount and application of torque can be made by the ECU 40 and/or PCU 42 based on several factors, including acceleration amount, steering angle, braking amount, suspension location, interaxle speed difference, drive torque, vehicle speed, yaw moment, etc.

The first circuit 29a can include a first pump 30a that is connected to a first purge valve, such as a solenoid valve 32a, by a first pump line 20a. The first valve 32a can be connected to the first clutch 12 by a first piston line 12a. A pressure sensor 38 can be located at a position along the first piston line 12a to monitor and report the pressure P2 thereof to the ECU 40. When the ECU 40 determines that actuation of clutch 12 is desired, the ECU 40 can send a signal to the motor 36 via the PCU 42 to cause the motor 36 to increase pump output from first pump 30a. The increased pump output causes pressure in the first pump line 20a to increase from a standby pressure P1 (or no pressure) to an active pressure P3. The active pressure P3 is greater than the desired operating pressure for the clutch 12. The ECU 40 then controls the valve 32a to divert hydraulic fluid from the first pump line 20a such that pressure in the piston line 12a is maintained at P2, which is substantially equal to the desired operating pressure for the clutch 12. Control of the valve 32a can be dynamic in nature such that the pressure P2 seen at the piston 19b rises quickly and arrives at the clutch/piston operating pressure smoothly and with little overshoot or fluctuation, regardless of the higher flow or pressure being output by the first pump 30a. If desired, a pilot line 37a can be provided with the valve 32a to provide a feedback passage to the valve 32a. While immediately after actuation, the system is dynamic in nature, the system can be configured to be primarily static in nature, such that P1=P2=P3 when balance is achieved.

Alternatively, control of pressure P2 can be accomplished solely through control of valve 32a if the output pressure produced by first pump 30a is maintained at a high enough pressure to provide the entire range of possible desired operating pressures for the clutch 12. In such a set up, there is no need for the pump to provide a standby pressure P1—the pump would only output an active pressure P3 that is higher than any possible desired operating pressure for the clutch 12. While such a system may be more responsive and easier to control, certain energy loss and component wear characteristics may not be desirable. Thus, the ECU 40 can be programmed to control one or both of the motor 36 and first valve 32a depending on various operating parameters, user choice, etc.

The second circuit 29b can include a second pump 30b that is connected to a second purge valve, such as a solenoid valve 32b, by a second pump line 20b. The second valve 32b can be connected to the second clutch 10 by a second piston line 10b. A pressure sensor 38 can be located at a position along the second piston line 10b to monitor and report the pressure P5 thereof to the ECU 40. When the ECU 40 determines that actuation of clutch 10 is desired, the ECU 40 can send a signal to the motor 36 via the PCU 42 to cause the motor 36 to increase pump output from second pump 30b. The increased pump output causes pressure in the second pump line 20b to increase from a standby pressure P4 (or no pressure) to an active pressure P6. The active pressure P6 can be greater than the desired operating pressure for the second clutch 10. The ECU 40 then controls the second valve 32b to divert hydraulic fluid from the second pump line 20b such that pressure in the piston line 10b is maintained at P5, which is substantially equal to the desired operating pressure for the clutch 10. Control of the valve 32b can be dynamic in nature such that the pressure P5 seen at the piston 18b rises quickly and arrives at the clutch/piston operating pressure smoothly and with little overshoot or fluctuation, regardless of the higher pressure being output by the second pump 30b. If desired, a pilot line 37b can be provided with the valve 32b to provide a feedback passage to the valve 32b.

Similar to the first circuit 29a, the second circuit 29b can achieve control of pressure P5 solely through controlling valve 32b if the output pressure produced by first pump 30a is maintained at a high enough pressure to provide the entire range of possible desired operating pressures for the second clutch 10.

Because the first clutch 12 and the second clutch 10 are operated through the use of separate hydraulic circuits 29a and 29b, respectively, each of the clutches can be separately and independently controlled with respect to each other. If the drive axles 16 are connected to rear wheels of a vehicle, the separate and independent control allows a user to control lateral torque distribution in the vehicle, as well as provide steering assistance, drive stabilizing functions, direct yaw control, etc. Of course, these features could also be realized if other combinations of vehicle wheels are powered by the clutches 10 and 12.

Figure 3:
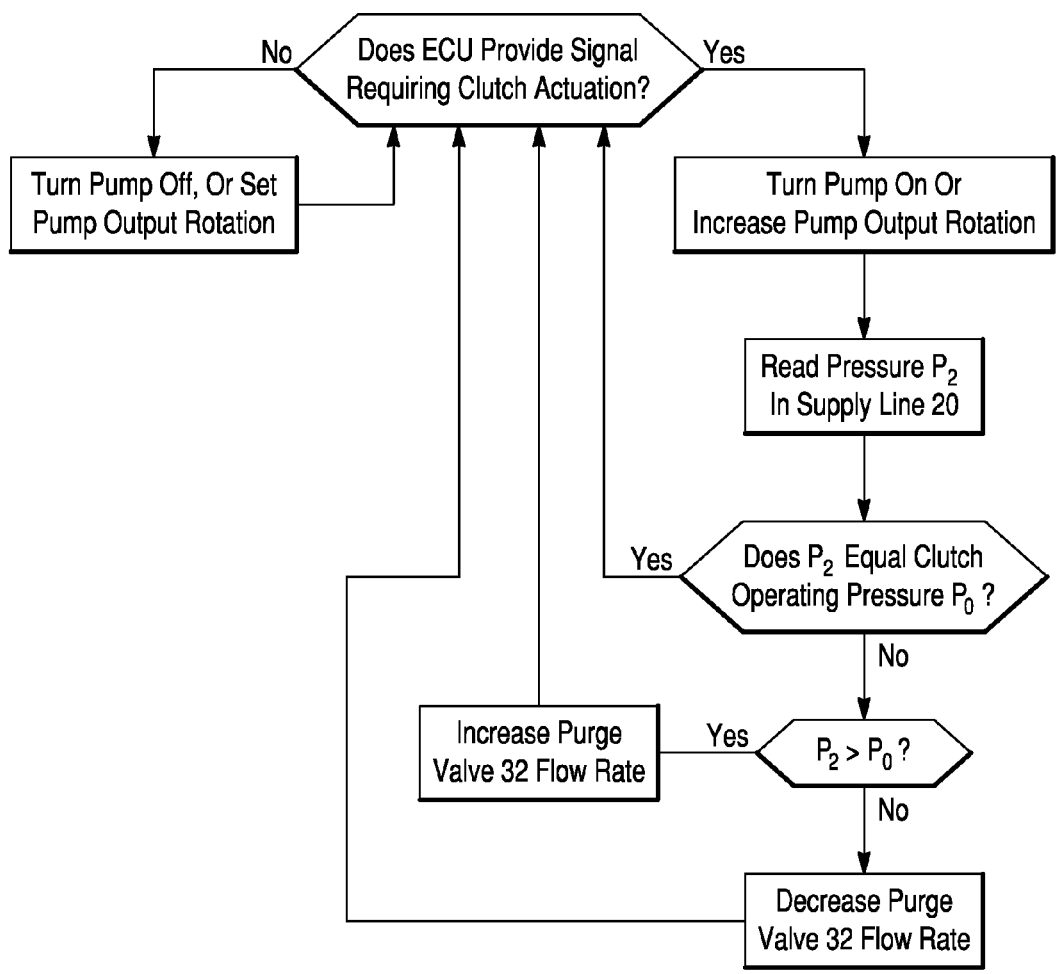
FIG. 3 is a flow diagram illustrating a process flow for the hydraulic vehicle clutch system of FIG. 1.

FIG. 3 is a flow diagram illustrating a process flow for the hydraulic vehicle clutch system of FIG. 1 in which the ECU 40 can be used to provide control over the entire hydraulic system 1. If the ECU 40 determines that the clutch or clutches do not need to be activated (no additional or different drive source for the vehicle is required), then the ECU 40 sends a signal to the PCU 42 to maintain the output pump rotation at a preset level (which can be zero). An associated standby pressure is thus output from the pump, which can be zero if the preset rotation of the pump is zero. When the ECU 40 determines that the clutch or clutches need to be actuated, a signal is sent to the PCU 42 from the ECU 40 to increase the pump 30 output flow to achieve pressure P3 which has higher potential than the operating pressure needed for clutches 10, 12 to output the particular/desired torque transmission. The ECU 40 then reads the pressure P2 detected at the downstream piston line 20 by the pressure sensor 38. Depending on the pressure reading received from the pressure sensor 38, the ECU 40 then sends a signal to the valve 32 to change the purge rate from either fully closed (no purge) to fully open (full purge) or possibly somewhere in between (partial purge). If the piston line 20 pressure P2 is equal to the desired operating pressure Po of the clutch 10 and/or clutch 12, the flow rate through the valve 32 is maintained. If the pressure P2 begins to exceed the operating pressure Po, the flow rate through the valve 32 is increased, thereby reducing the pressure P2 and maintaining it at Po. Conversely, if the pressure P2 begins to drop below the operating pressure Po, the flow rate through the valve 32 is decreased to maintain it at Po. Moreover, the ECU 40 controls pressure P2 (and not flow, per se) by controlling valve 32, which can be configured as a linear pressure control valve (e.g., not a flow control valve).

Figure 4:
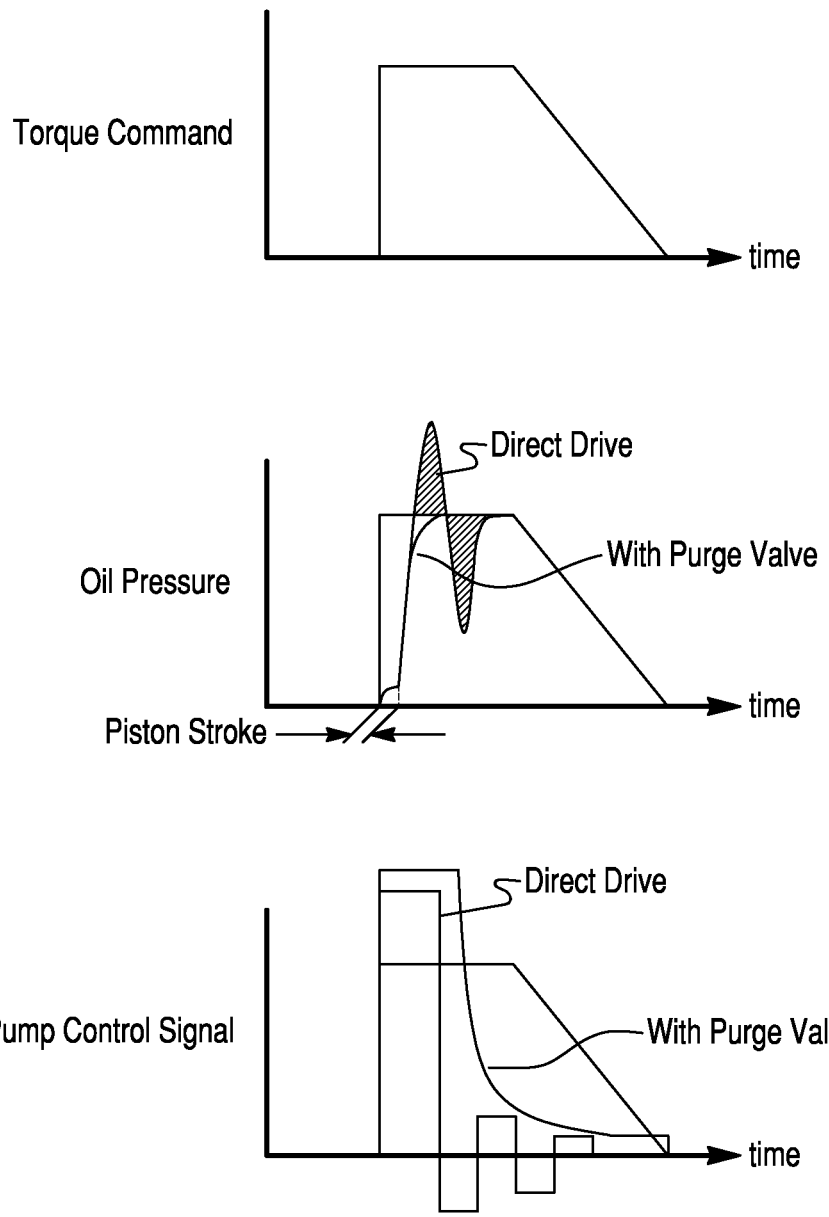
FIG. 4 is a set of comparative charts showing torque command signal, oil pressure, and pump control signal with respect to time for a direct drive system and for a purge valve system made in accordance with principles of the disclosed subject matter.

FIG. 4 shows a set of comparative charts showing torque command signal, oil pressure, and pump control signal with respect to time for a direct drive system and for a purge valve system made in accordance with principles of the disclosed subject matter. The lines representing the direct drive system are shown for comparison purposes and correspond to a system in which a pump is connected directly to a piston/clutch mechanism with no purge valve located therebetween. In such a case, as shown in the Oil Pressure chart, when the pump receives a signal from the ECU to increase the pressure of hydraulic fluid in the hydraulic circuit, precise control of the pressure is difficult. Initially, the pressure typically shoots past the desired operating pressure, then is over controlled/reduced to a pressure well below the desired operating pressure, and undergoes several correcting actions/fluctuations before stabilizing at the desired operating pressure. By contrast, when a purge valve is used in this circuit, as shown in the Oil Pressure chart, the hydraulic pressure takes slightly longer to initially arrive at desired operating pressure, but very little fluctuation of pressure occurs after the initial arrival, and highly accurate control is thus achieved. It is believed that this is achieved because the purge valve controls the initial energy/pressure burst produced by the pump and removes the large fluctuation of pressure that would otherwise be initially present in the hydraulic circuit.

Use of a hydraulic circuit vehicle clutch system that consists only of an oil pump and a clutch provides a simple and light weight system. However, as can be seen in FIG. 4, control precision is lacking (even when a motor control system is precisely controlled). The use of a purge valve in the system provides the desired control precision while not adding significant weight, size or cost. When used with a system that includes right and left torque distribution (e.g., the system shown in FIG. 3), the use of the system with a purge valve provides even greater weight size and cost reduction characteristics. Additionally, due to the ability to increase the clutch thrust, the presently disclosed subject matter also makes it possible to decrease not only the weight of the system but also the size (and weight) of the clutch structure itself.

Figure 5:
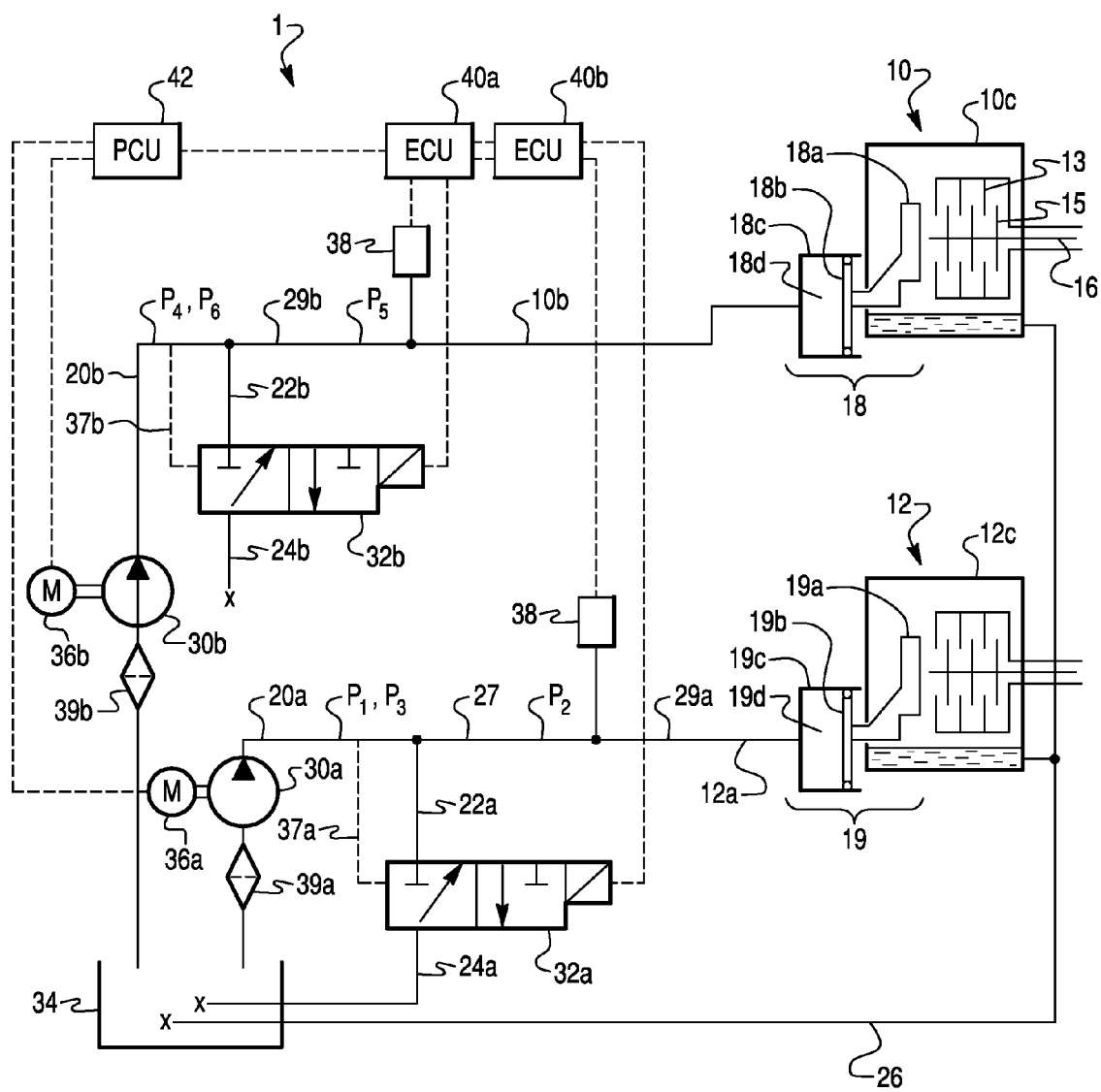
FIG. 5 is a schematic diagram of another embodiment of a hydraulic vehicle clutch system made in accordance with principles of the disclosed subject matter.

As shown in FIG. 5, a multi-circuit device can include two separate motors 36a and 36b that can be controlled either together or separately to provide power to the two circuit pumps 30a and 30b, respectively. Thus, an entire circuit can be de-activated if desired. Two ECU's 40a and 40b can also be provided to separately control each of the hyrdraulic circuits 29a and 29b and to provide redundancy backup in case one ECU malfunctions and must be de-activated. Moreover, the motor 36a and pump 30a can both be actuated at different times and at different speeds with respect to the motor 36b and pump 30b to selectively provide different operating characteristics to either of the circuits.

While certain embodiments of the invention are described above, it should be understood that the invention can be embodied and configured in many different ways without departing from the spirit and scope of the invention. For example, although the purge valve is described as a variable-type linear solenoid valve, other types of valves can be used without departing from the spirit and scope of the invention. For example, pneumatic valves or hydraulic valves could replace the solenoid valve. In addition, other electronically controlled valves could be used, such as servo-valves, spring valves, duty controlled valves, other types of linear and non-linear solenoid valves, etc. With regard to the pump, a typical hydraulic fluid pump can be used, including oil pump, etc. A motor can be used for each pump, or a single motor can be used to drive two or more pumps (as shown in the embodiment of FIG. 2). However, if a single motor is used, respective dynamic control of the hydraulic pressure in each of the hydraulic circuits can be accomplished only by varying the purge valve(s). The motor can be an electric motor, a pneumatic motor, hydraulic motor, or other type of power unit. Any of the components can be configured to be actively controlled by the ECU 40 or other control system.

The clutches can be used in any combination of front wheels, rear wheels, front and real wheels, all wheels, etc. The hydraulic lines connecting the various components of the hydraulic circuits can be separate lines that are attached by fittings to the valve, clutch, pump, etc. In the alternative, the hydraulic lines can be built into an existing vehicle drive train structure, such as the front or rear differential, transmission, etc. In such a case, the lines can be machined or molded directly into the casing of the differential, transmission, or other structure.

In addition, the clutches need not be of the multi-plate wet clutch variety. For example, centrifugal clutches, diaphragm clutches, hydraulic clutches/viscous clutches, single plate clutches, and other clutch types could be incorporated into the system of the disclosed subject matter without departing from the spirit and scope.

As discussed in detail above, the pressure P1 or P3 (depending on whether providing standby or active pressure) in the pump line 20 is substantially the same along its entire length. In addition, the pressure P2 in the piston line 10a is substantially the same along its entire length. It should be noted that the pressure is considered to be substantially the same in each of these lines, respectively, even though there are certain minor variations caused by head loss, friction loss, etc., in each of the hydraulic circuit lines. The pressure in any given portion of the hydraulic circuit is substantially changed by operating structures that are configured to either act upon or to be acted upon by a hydraulic fluid resulting in a change of pressure of the hydraulic fluid. These operating structures include but are not limited to pumps, valves, pistons/cylinders, turbines, vanes, accumulators, regulators, change-over valves, heat exchangers, etc.

In addition, while the ECU 40 and PCU 42 are described as receiving and outputting signals to control motor rotation and valve actuation, the ECU 40 and PCU 42 can control (and indirectly control) through the use of other variables that are measured in the system, including fluid pressures, fluid flow, clutch torque transfer rates, etc.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. An apparatus for transferring a torque from a vehicle drive train to a wheel of a vehicle, the apparatus comprising:
    a first clutch having a first driven part and a first driving part;
    a second clutch having a second driven part and a second driving part;
    a hydraulic system configured to actuate the first clutch and the second clutch by placing the first driven part into engagement with the first driving part and by placing the second driven part into engagement with the second driving part, the hydraulic system including:
        a first cylinder,
        a second cylinder,
        a first piston movably received in the first cylinder and configured to move the first driven part into engagement with the first driving part when an operating hydraulic fluid pressure is supplied to the first piston,
        a second piston movably received in the second cylinder and configured to move the second driven part into engagement with the second driving part when an operating hydraulic fluid pressure is supplied to the second piston,
        a pump in fluid communication with the first piston and the second piston and configured to supply an output hydraulic fluid pressure, and
        a purge valve connected to a junction that is located between the pump and each of the first piston and the second piston and connected to the pump in parallel fluid communication with each of the first piston and the second piston, the purge valve is a variable-type linear solenoid valve that has a fully closed position, a fully open position, and a plurality of intermediate positions such that fluid flow through the purge valve is prevented if the purge valve is in the fully closed position, fluid flows through the purge valve at a first flow rate if the purge valve is in the fully open position, and fluid flows through the purge valve at one of a plurality of intermediate flow rates if the purge valve is in a respective one of the intermediate positions, where each of the intermediate flow rates is less than the first flow rate; and a controller in communication with the hydraulic system and configured to control each of the pump and purge valve to provide a desired hydraulic pressure to the first piston and the second piston.

2. The apparatus of claim 1, wherein the controller includes means for causing the pump to operate at a first output pressure that is greater than the operating hydraulic pressure of the piston, and for causing the purge valve to reduce the first output pressure of the hydraulic fluid to the operating hydraulic pressure before the hydraulic fluid reaches the first piston and the second piston when the pump is operating at the first output pressure.

3. The apparatus of claim 1, wherein the controller includes means for causing the pump to operate at a second output pressure when the first piston and the second piston are not actuated such that the hydraulic fluid continues moving through the hydraulic system such that the hydraulic fluid provides cooling to at least a portion of the apparatus.

4. The apparatus of claim 1, wherein the controller is configured to operate the pump at a second output pressure when the first piston and the second piston are not actuated such that the hydraulic fluid continues moving through the hydraulic system such that the hydraulic fluid provides cooling to at least a portion of the apparatus.

5. An apparatus for transferring a torque from a vehicle drive train to at least one wheel of a vehicle, the apparatus being configured for use independently of an accumulator, the apparatus comprising:
   a first clutch having a first driven part and a first driving part;
   a second clutch having a second driven part and second driving part;
   a hydraulic system configured to selectively actuate the first clutch and the second clutch together by placing the first driven part into engagement with the first driving part and by placing the second driven part into engagement with the second driving part, the hydraulic system including:
      a first piston configured to move the first driven part into engagement with the first driving part to actuate the first clutch when a first operating hydraulic pressure is supplied to the first piston,
      a second piston configured to move the second driven part into engagement with the second driving part to actuate the second clutch when a second hydraulic pressure is supplied to the second piston,
      a pump configured to supply an output hydraulic pressure,
      a purge valve connected to the pump in parallel with the first piston and the second piston, the purge valve includes a fully closed position, a fully open position, and an intermediate position located between the fully closed position and the fully open position,
      a pump hydraulic line connected between the pump and a junction,
      a valve line connected between the purge valve and the junction,
      a first piston hydraulic line connected between the junction and the first piston, and
      a second piston hydraulic line connected between the first piston hydraulic line and the second piston, wherein
      each of the first piston hydraulic line and the second piston hydraulic line are devoid of a valve, and wherein
      the hydraulic system is configured such that when the first clutch is actuated a first pump pressure of hydraulic fluid is substantially constant along the entire pump hydraulic line from the pump to the junction without use of the accumulator, and the hydraulic system is also configured such that when the first clutch is actuated a first piston pressure of hydraulic fluid is substantially the same along the entire first piston hydraulic line from the junction to the first piston without use of the accumulator; and
   a controller in electrical communication with each of the pump and the purge valve and configured to control each of the pump and purge valve to provide a first desired hydraulic pressure to the first piston.

6. The apparatus of claim 5, wherein the piston pressure of hydraulic fluid in the first piston hydraulic line is substantially equal to the first operating hydraulic pressure when the first clutch is actuated.

7. The apparatus of claim 5, wherein the pump pressure of hydraulic fluid in the pump hydraulic line is greater than the first operating hydraulic pressure when the first clutch is actuated.

8. The apparatus of claim 5, wherein the purge valve is a variable-type linear solenoid valve.

9. The apparatus of claim 5, wherein the controller includes means for causing the pump to operate at a working output pump pressure that is greater than the first operating hydraulic pressure of the first piston, and for causing the purge valve to reduce pressure of the hydraulic fluid to the first operating hydraulic pressure before the hydraulic fluid reaches the first piston, when the first clutch is actuated.

10. The apparatus of claim 5, wherein the controller includes means for causing the pump to operate at a standby output pump pressure when the first clutch is not actuated such that the hydraulic fluid continues moving through the hydraulic system and such that the hydraulic fluid provides at least one of cooling and lubrication to at least a portion of the apparatus.

11. A method for transmitting torque to a vehicle drive component, the method comprising:
   providing a first vehicle clutch configured to transmit torque from a vehicle power unit to a first vehicle wheel when the first vehicle clutch is actuated;
   providing a second vehicle clutch configured to transmit torque from a vehicle power unit to a second vehicle wheel when the second vehicle clutch is actuated;
   providing a first hydraulic circuit including hydraulic fluid and in which a pump is connected by a pump line to a purge valve, and the purge valve is connected to a first piston by a first piston line, the purge valve is connected to a second piston by a second piston line, the first piston being configured to actuate the vehicle clutch when a first operating pressure of the hydraulic fluid is applied to the first piston, the second piston being configured to actuate the second vehicle clutch when the first operating pressure of the hydraulic fluid is applied to the second piston, and the pump being configured to act on the hydraulic fluid to output a first pump hydraulic pressure, wherein providing the purge valve including providing the purge valve connected to the first pump in parallel with the first piston and providing the purge valve connected in parallel with the second piston and wherein providing the purge valve, includes providing the purge valve with a fully closed position, a fully open position, and at least one intermediate position, located between the fully closed position and the fully open position;

providing a controller in electrical communication with each of the first pump and the purge valve; and simultaneously controlling the pump and the purge valve if an activated state is requested, including:

determining a value for the first pump hydraulic pressure;

determining a value for the first operating pressure that is less than the determined value for the first pump hydraulic pressure;

signalling the pump to output a pressure that is equal to the determined value for the first pump hydraulic pressure;

sensing a fluid pressure downstream of the purge valve;

comparing the sensed downstream fluid pressure to the determined value for the first operating pressure;

signalling the purge valve to increase a flow rate of hydraulic fluid through the purge valve if the sensed downstream fluid pressure is greater than the first operating pressure; and signalling the purge valve to decrease the flow rate of hydraulic fluid through the purge valve if the sensed downstream fluid pressure is less than to the first operating pressure.

12. The method of claim 11, further including:

continuously operating the first pump to circulate hydraulic fluid through the first hydraulic circuit both when the first vehicle clutch is actuated and when the first vehicle clutch is not actuated, thereby providing a source of at least one of cooling and lubrication.

13. The method of claim 11, further comprising:

controlling hydraulic fluid pressure in the first piston line such that the hydraulic fluid pressure does not surpass the first operating pressure.

14. The apparatus of claim 1, wherein the hydraulic system further includes:

a first hydraulic line extending from the pump to a purge valve;

a second hydraulic line extending from the junction to the first piston;

a third hydraulic line extending from the second hydraulic line to the second piston;

a reservoir in fluid communication with the pump and the purge valve; and a motor connected to the pump; and wherein the controller includes:

an electronic control unit;

a sensor in electrical communication with the electronic control unit and in fluid communication with the second hydraulic line; and a pump control unit in electrical communication with the electronic control unit and the motor.

\* \* \* \* \*